No. 887,296. PATENTED MAY 12, 1908.
G. WESTINGHOUSE.
AUTOMATIC CAR COUPLING.
APPLICATION FILED SEPT. 16, 1905.
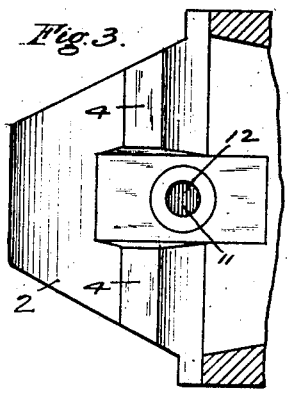
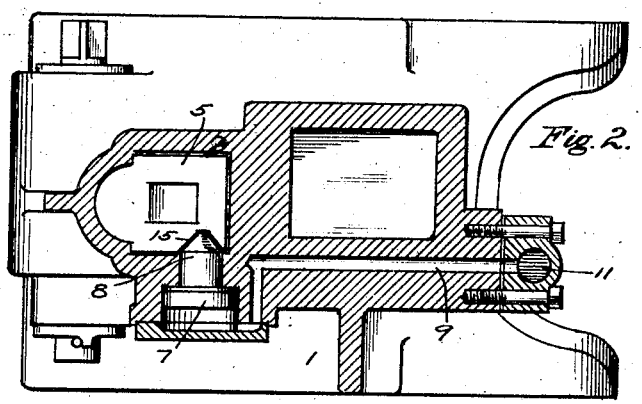
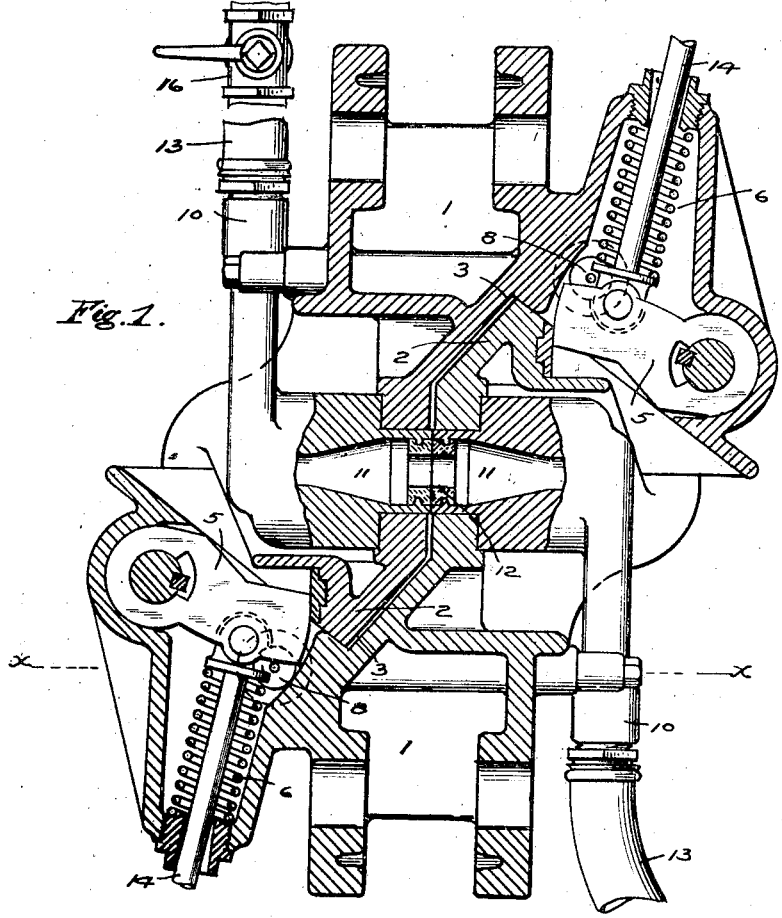
WITNESSES
INVENTOR
George Westinghouse
by Wright

UNITED STATES PATENT OFFICE.

GEORGE WESTINGHOUSE, OF PITTSBURG, PENNSYLVANIA.

AUTOMATIC CAR-COUPLING.

No. 887,296.      Specification of Letters Patent.      Patented May 12, 1908.

Application filed September 16, 1905. Serial No. 278,826.

*To all whom it may concern:*

Be it known that I, GEORGE WESTINGHOUSE, a citizen of the United States, residing in Pittsburg, in the county of Allegheny and State of Pennsylvania, have invented a certain new and useful Improvement in Automatic Car-Couplings, of which the following is a specification.

This invention relates to automatic car coupling devices for cars or other railway vehicles, and more particularly to that type in which draw bar coupling mechanism is combined with means for coupling the air brake pipe, or other fluid pressure conduits, such as shown in my prior patent No. 708747, of Sept. 9, 1902.

The principal object of my present improvement is the provision of fluid pressure means for holding the locking device in position to more firmly clamp the two counterpart coupling heads together when the same are coupled up.

In the accompanying drawings, Figure 1 is a central horizontal section showing the two counterpart members in coupled position; Fig. 2 a transverse section of one of the coupler heads taken on the line *x—x* of Fig. 1; and Fig. 3 a vertical section of end portion of a coupler head, showing in elevation the face which engages a corresponding face of a counterpart coupler head.

As shown in the drawings, the coupler head is formed of a casting 1 of the desired size and configuration having a projecting portion 2 and a recess 3 for engaging the corresponding parts of a counterpart coupler head on an adjacent car. Centrally arranged, transversely of the coupler, is a vertical and longitudinal plane surface through which one or more openings are made for fluid pressure conduit connections. Above and below this plane surface are formed transverse projections or hooked portions 4 having inclined surfaces adapted to engage and interlock with corresponding portions of a counterpart coupler head, each head being provided with a pivoted latch or locking lever 5 having a cam surface for engaging a corresponding curved surface on the projecting portion 2 of the counterpart coupling head, and a spring 6 acting to force said lever into locking position. Each coupler head is provided with a nozzle 10 connected with the hose 13 of the air brake pipe, or other fluid pressure conduit, and communicating by a passage 11 with the opening in the face of the coupler, in which is mounted a gasket 12 for making a tight joint. As thus far described, the structure corresponds substantially with that covered in my prior patent above referred to.

According to my present improvement, a fluid pressure locking device is employed for holding the lever in locking position when the cock in the air conduit is open and this is preferably arranged by providing a small piston 7 with a tapered stem 8 engaging an inclined groove 15 in the lever 5, and a port 9 for admitting fluid under pressure to the piston 7. By this means the locking lever is firmly clamped in position whenever the members are coupled together and the air conduit is open.

The angle cock 16 which is employed for controlling communication through the air brake pipe, is preferably of the type in which the space in the pipe between the cock and the coupling is bled to the atmosphere when the cock is closed. The spring 6 normally forces the latch 5 outward to its locking position and any preferred form of mechanism, such as rod 14, may be employed for withdrawing the latch and releasing the coupler.

When a coupling is to be made with an adjacent car, the coupler heads are brought together by impact, so that the projecting portion 2 of each head enters the recess 3 of the other, depressing the latches or locking levers 5 until the hooked portion 4 of the coupler heads pass one another, whereupon the springs 6 force the locking levers with their cam-shaped end faces out into engagement with the corresponding curved surfaces in the notches of the heads, thereby pressing the two counterpart members tightly together with the gasket openings of the fluid pressure conduits in register with each other. The angle cocks may then be turned to open communication through the air pipe connection, whereupon the air under pressure also flows through passage 9 into the cylindrical space beneath the locking piston 7, forcing the same up against its seat and the stem 8 with its tapered end into engagement with groove 15 of the locking lever 5, thereby securely holding said levers in locked position.

When it is desired to uncouple, the angle cocks are first turned to closed position, thereby bleeding the air under pressure from the coupling and space beneath the piston 7, then the locking levers 5 may be withdrawn to release position by means of pull rods 14 or other mechanism. In this movement of the locking lever the spring 6 is compressed and the groove 15 engages the tapered end of the stem 8, thereby forcing the piston 7 downward to its release position. The coupling is then unlocked and the members free to separate.

It will now be seen that by means of my improvement the members of the coupling may be securely locked together and effectually prevented from being pulled apart when the air pressure is on.

Having now described my invention, what I claim as new and desire to secure by Letters Patent is:—

1. An automatic car coupling comprising a casting adapted to be connected to the draw bar for transmitting stresses thereto and having a laterally projecting hooked portion adapted to engage a similar hooked portion of a counterpart coupling, and a fluid pressure locking device for holding said coupling members pressed together laterally.

2. An automatic car coupling comprising a casting having a laterally projecting hooked portion adapted to engage a similar hooked portion of a counterpart coupling, a spring actuated locking lever for clamping said coupling members together laterally, and means operated by fluid pressure for holding said lever in locking position.

3. An automatic car coupling comprising a casting having a rigid laterally projecting hooked portion adapted to engage a similar hooked portion of a counterpart coupling, and an opening for coupling a fluid pressure conduit, and a locking device operated by fluid pressure from said conduit for holding said coupling members pressed together.

4. An automatic car coupling comprising a casting having a laterally projecting hooked portion adapted to engage a similar hooked portion of a counterpart coupling, a locking lever for laterally clamping said coupling members together, and a piston and stem operated by fluid pressure for holding said lever in locking position.

5. An automatic car coupling comprising a casting having a rigid laterally projecting hooked portion adapted to engage a similar hooked portion of a counterpart coupling, and an opening for coupling a fluid pressure conduit, a cock for controlling communication through the conduit, and a locking device operated by fluid pressure from the conduit when the cock is open for holding said coupling members together.

6. An automatic car coupling comprising a member having a laterally projecting hooked portion adapted to engage a similar hooked portion of a counterpart coupling, and an opening for connecting a fluid pressure conduit, a locking lever for clamping said coupling members together, and a piston subject to the fluid pressure of said conduit and having a tapered stem for engaging said locking lever.

7. An automatic car coupling comprising a member having projecting and recess portions for engaging corresponding portions of a counterpart coupling member, and an opening for connecting a fluid pressure conduit, a locking device comprising a spring actuated lever for clamping said members together, and fluid pressure actuated means for securing said locking device.

8. An automatic coupling comprising a rigid laterally projecting hooked portion adapted to engage a similar hooked portion of a counterpart coupling, and a fluid pressure locking device for holding said coupling members pressed together.

9. An automatic coupling comprising a rigid laterally projecting hooked portion adapted to engage a similar hooked portion of a counterpart coupling, a locking lever for clamping said coupling members together, and means operated by fluid pressure for holding said lever in locking position.

In testimony whereof I have hereunto set my hand.

GEO. WESTINGHOUSE.

Witnesses:
R. F. EMERY,
J. B. MACDONALD.